United States Patent
Seltzer et al.

(10) Patent No.: US 6,392,960 B1
(45) Date of Patent: May 21, 2002

(54) ACOUSTIC COMMUNICATION OF CODED MULTI-CHANNEL DIGITAL MESSAGES IN A LIQUID MEDIUM

(76) Inventors: Richard A. Seltzer, 9225 Countryway Dr., Knoxville, Knox County, TN (US) 37922; Blake E. Atkins, 449 Wedgewood Dr., Alcoa, Blount County, TN (US) 37701; Mark K. Mosteller, 11428 Hickory Springs Dr.; Wayne Prichard, 2542 Choto Rd., both of Knoxville, Knox County, TN (US) 37922

(*) Notice: Subject to any disclaimer, the term of this patent is extended or adjusted under 35 U.S.C. 154(b) by 0 days.

(21) Appl. No.: 09/649,454

(22) Filed: Aug. 25, 2000

(51) Int. Cl.[7] .............................................. H04B 11/00
(52) U.S. Cl. ..................................................... 367/134
(58) Field of Search ............................... 367/134, 131, 367/132

(56) References Cited

U.S. PATENT DOCUMENTS

| | | | |
|---|---|---|---|
| 4,203,164 A | 5/1980 | Isaak et al. | 367/134 |
| 4,208,734 A | 6/1980 | Garber et al. | 367/134 |
| 4,951,263 A | 8/1990 | Shope | 367/2 |
| 5,018,114 A | 5/1991 | Mackelburg et al. | 367/134 |
| 5,029,147 A | 7/1991 | Andrews et al. | 367/134 |
| 5,121,366 A | 6/1992 | Wayner et al. | 367/134 |
| 5,124,955 A | 6/1992 | Jackson et al. | 367/134 |
| 5,127,051 A * | 6/1992 | Chan et al. | 380/49 |
| 5,303,207 A | 4/1994 | Brady et al. | 367/134 |
| 5,412,620 A | 5/1995 | Cafarella et al. | 367/134 |
| 5,469,403 A | 11/1995 | Young et al. | 367/6 |
| 5,701,276 A | 12/1997 | Bellini | 367/133 |
| 5,784,339 A | 7/1998 | Woodsum et al. | 367/134 |

* cited by examiner

Primary Examiner—Daniel T. Pihulic
(74) Attorney, Agent, or Firm—Pitts & Brittian, P.C.

(57) ABSTRACT

A device for acoustic communication of coded multi-channel digital messages in a liquid medium. The device is designed to use a single carrier frequency and includes the use of acoustic transducers in signal communication, and may include interfaces for communication with a variety of peripherals, host computing devices, and user communication and control devices. The device incorporates effective methods of encoding, transmitting, receiving, decoding, and acknowledgment of digital signals for achieving the desired level of reliability, bi-directional communication and multi-channel capability. The device is a communication subsystem configured to provide communication with another device of the present invention. The device is composed primarily of electronic circuitry containing a processor, system firmware and other electronic components for sending and receiving acoustic signals and for communicating with a variety of peripherals including an intelligent host device and a variety of user communication and control devices.

52 Claims, 6 Drawing Sheets

ACOUSTIC COMMUNICATION OF CODED MULTI-CHANNEL DIGITAL MESSAGES IN A LIQUID MEDIUM

TECHNICAL FIELD

The present invention relates to an acoustic communication system. More specifically, the present invention relates to an acoustic, multi-channel, digital communication system for use in a liquid medium.

BACKGROUND ART

The difficulties of acoustic digital communication in a liquid medium are well known. Multi-path interference results from reflected signals. Such multi-path interference along with environmental noise, temperature variations and other factors negatively impacts reliable communication. Further, for applications requiring multi-channel communications without cross channel interference, such requirements add to the difficulty of reliable communication.

Several devices and methods have been disclosed by the prior art to include the use of multiple carrier frequencies, matched filtering, automatic gain control, serial correlation and relatively high transmit power to address signal distortion caused by noise and multi-path interference. Generally speaking, these methods carry the disadvantages of relatively high implementation costs and often less than desired reliability. For example, the use of multiple carrier frequencies requires acoustic transducers that have sufficient bandwidth to accommodate the frequency range. This approach also requires exceptionally tight filtering to prevent signals on a given frequency from interfering with signals using other frequencies. The resulting bandwidth and filtering requirements create higher component and implementation costs. The use of relatively high transmit power to differentiate true signals from noise and reflected signals also has the disadvantage of higher component and operating costs. Typical of the art are those devices disclosed in the following U.S. Patents:

| U.S. Pat. No. | Inventor(s) | Issue Date |
| --- | --- | --- |
| 4,203,164 | R. D. Isaak et al. | May 13, 1980 |
| 5,029,147 | G. J. Andrews et al. | July 2, 1991 |
| 5,303,207 | D. P. Brady et al. | April 12, 1994 |
| 5,412,620 | J. H. Cafarella et al. | May 2, 1995 |
| 5,784,339 | H. C. Woodsum et al. | July 21, 1998 |

Of these patents, Isaak et al., ('164) teach an improved sonar system with exceedingly long range that is not readily susceptible to enemy detection. The '164 device is operated by generating a pseudo-noise output signal using multiple carrier frequencies decoded by an equivalent receiver.

The '147 device taught by Andrews et al., is an acoustic, underwater telemetry system that uses a combination of short and long pseudo-noise codes across multiple carrier frequencies.

Brady et al., ('207) teach an underwater local area network that seeks to avoid collision from multiple transmissions by using a virtual circuit system. The virtual circuit system routes a signal through a series of transmitters and receivers based on node sequences established by the network nodes.

Cafarella et al., ('620) teach a high data rate acoustic communication system that encodes, transmits, receives and decodes a digital signal over a carrier frequency. The method steps used by the '620 device include generating a spread spectrum waveform in real time for the transmit signal; using phase-based keying; conditioning with a power amplifier and automatic gain control (AGC); using antipodal, bi-phase modulation; conditioning the received signal using AGC; performing matched filtering on the received signal; performing signal detection using an amplitude based trigger signal; and performing serial correlation on the received signal. The '620 device incorporates a transmitter which includes a spread spectrum waveform generator, a heterodyne state, and a power amp. The spread spectrum waveform generator includes a feedback shift register sequence generator and a means to create a digital power control word, each operating in real time. Further, the waveform generator includes, among other things, an FIR digital filter, digital-to-analog conversion circuitry, spectral shaping, an up-conversion stage and a differential power amplifier driver.

Woodsum et al. ('339) teach an underwater location and communication system that utilizes a method of encoding where each data bit in a block of data occupies a separate and distinct frequency band.

An object of the present invention is to provide a device for acoustic communication of coded multi-channel digital messages in a liquid medium using a single carrier frequency.

Another object of the present invention is to provide high reliability of communication by dealing effectively with multi-path interference and noise conditions found in liquid environments.

Still another object of the present invention is to provide communication between transceiver modules.

Yet another object of the present invention is to provide multi-channel capability that will allow communication among transceiver modules on one designated channel to operate without interference from other modules operating on another designated channel.

Another object of the present invention is to accomplish such a device at a lower implementation cost when compared to prior art devices.

Still yet another object of the present invention to provide such a device which operates using lower power when compared to prior art devices.

A further object of the present invention is to provide peripheral interfaces to allow information to be communicated to and from a variety of peripherals.

Another object of the present invention is to provide a host interface that allows interaction between the present invention and an intelligent host.

Another object of the present invention is to provide a user interface that allows interaction between the present invention and a variety of user communication and control devices.

DISCLOSURE OF THE INVENTION

Other objects and advantages will be accomplished by the present invention which serves to accomplish acoustic communication of coded multi-channel digital messages in a liquid medium at lower cost and using lower power than prior art devices. The device is designed to use a single carrier frequency. The device includes the use of acoustic transducers in signal communication, and may include interfaces for communication with a variety of peripherals, host computing devices and/or user communication and control devices. The device of the present invention incorporates effective methods of encoding, transmitting, receiving, decoding, and acknowledgment of digital signals for achieving the desired level of reliability, bi-directional communication and multi-channel capability.

The device is a communication subsystem capable of encoding, transmitting, receiving and decoding a digital message and a message acknowledgment, and is configured to provide such communication with another device of the present invention. The device is composed primarily of electronic circuitry containing a processor, system firmware and other electronic components necessary to enable system operation. The device includes at least one acoustic transducer to send and receive the acoustic signals using one designated carrier frequency. The device may include a peripheral interface that allows communication with a variety of peripherals. A host interface may be carried on the device for allowing communication with an intelligent host device such as a personal computer. Further, the device may include a user interface for allowing interaction with a variety of user communication and control devices such as alarms, push buttons, and displays.

The elements contained within the electronic circuitry, in conjunction with the acoustic transducers, collectively perform message encoding, transmission, reception, decoding and acknowledgment, and may utilize the functions of the peripheral interface, host interface and user interface. Specifically, with respect to message encoding, the message is encoded for transmission, including at least a message definition, a message header, and error detection and/or correction data. With respect to message transmission, the present invention addresses chip configuration, multi-channel operation, inter-chip gaps, message modulation, and single carrier frequency. Similarly, with respect to message reception, the present invention addresses single carrier frequency, signal conditioning, filtering, frequency mixing, compression, sampling, decompression, noise floor removal, and digital filtering. Message decoding addresses chip array averaging, shape based correlation, correlation coefficient averaging, message header verification, payload and error detection and/or correction, expected bit verification, and optionally, time-shifted parallel decoding and detection. Finally, with respect to message acknowledgment, the present invention provides a confirmation message and follows retransmission protocol that is specified for the application.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A device for bi-directional acoustic communication of coded multi-channel digital messages in a liquid medium incorporating various features of the present invention is illustrated generally at 10 in the figures. The device for bi-directional acoustic communication of coded multi-channel digital messages in a liquid medium, or device 10, is designed to accomplish such bi-directional communication at lower cost and using lower power than prior art devices. In the preferred embodiment the device 10 is designed to use a single carrier frequency. The device 10 includes the use of acoustic transducers in signal communication, and ray include interfaces for communication with a variety of peripherals, host computing devices and/or user communication and control devices. The device 10 incorporates effective methods of encoding, transmitting, receiving, decoding, and acknowledgment of digital signals for achieving the desired level of reliability, bi-directional communication and multi-channel capability.

Figure 1:
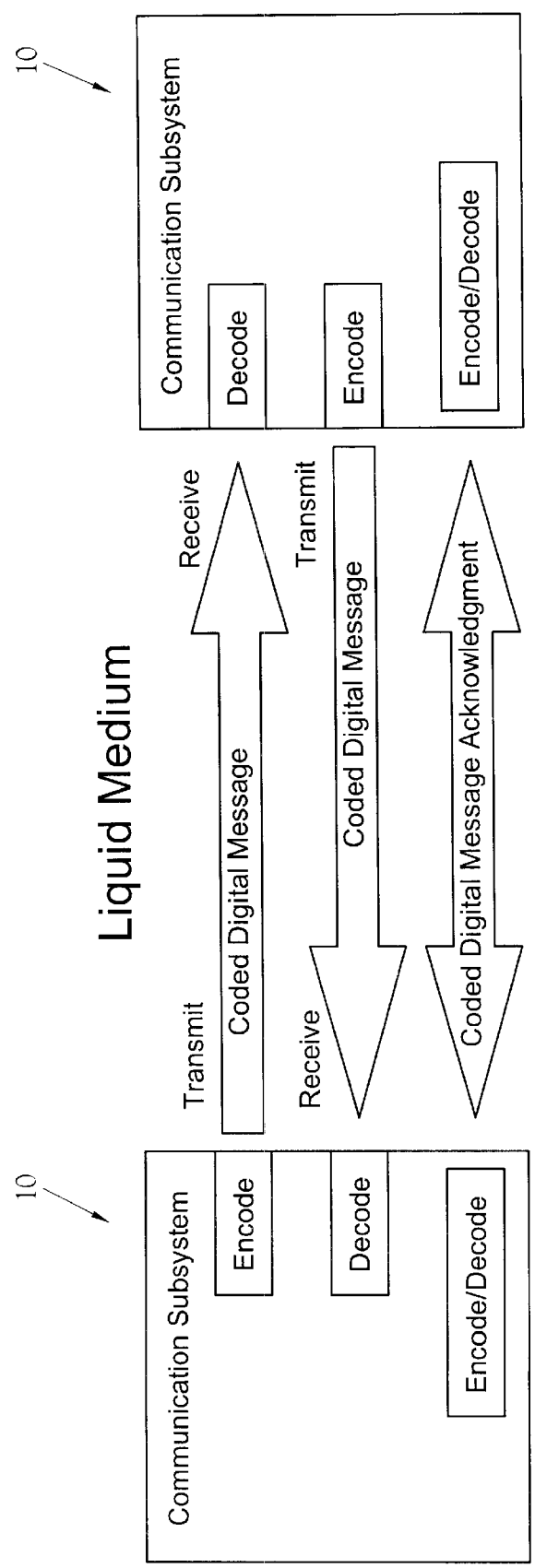
FIG. 1 is a block diagram illustrating the primary interaction between two devices of the present invention in order to accomplish bi-directional acoustic communication of coded multi-channel digital messages in a liquid medium.
Figure 2:
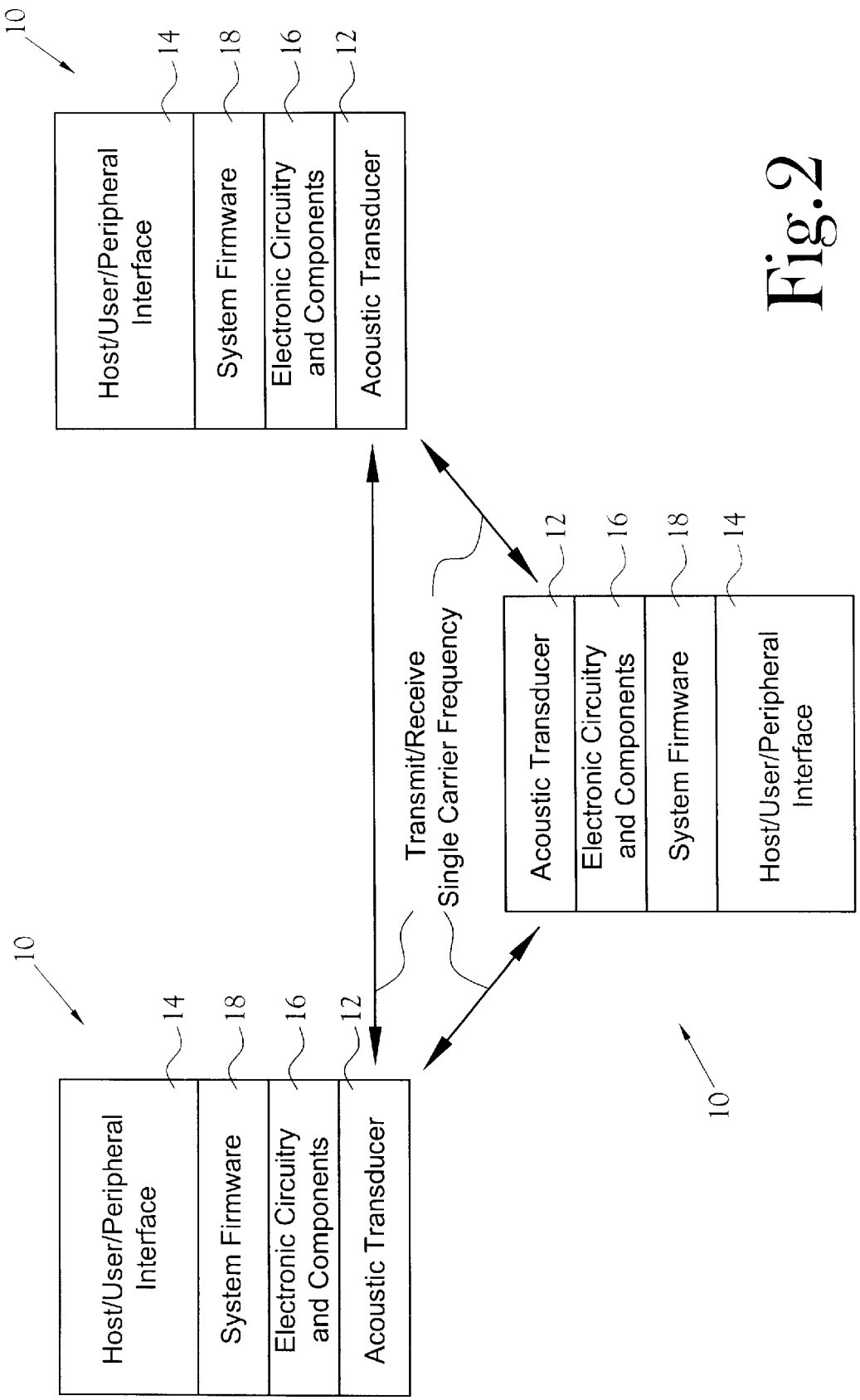
FIG. 2 is a block diagram of the operation of three devices of the present invention, showing the basic components of the device therein.

The device 10, as illustrated in FIG. 1, is a communication subsystem capable of encoding, transmitting, receiving and decoding a digital message and a message acknowledgment, and is configured to provide such communication with another device 10 of the present invention. As better illustrated in FIG. 2, a system is composed primarily of two devices 10 each containing a processor, system firmware 18 and other electronic components necessary to enable system operation. Each device 10 includes at least one acoustic transducer 12 to send and receive the acoustic signals using one designated carrier frequency. In the illustrated embodiment, each device 10 includes a peripheral interface 14 that allows communication with a variety of peripherals. Exemplary peripherals are those for monitoring movement, temperature, and pressure. A host interface also illustrated at 14 is carried on the illustrated device 10 for allowing communication with an intelligent host device such as a personal computer. Further, illustrated at 14, the device 10 includes a user interface for allowing interaction with a variety of user communication and control devices such as alarms, push buttons, and displays.

The elements contained within the electronic circuitry 16, in conjunction with the acoustic transducers 12, collectively perform message encoding, transmission, reception, decoding and acknowledgment, and may utilize the peripheral interface, host interface and user interface 14. Specifically, with respect to message encoding, the message is encoded for transmission, the message including at least a message definition, a message header, and error detection and/or correction data. With respect to message transmission, the present invention addresses chip configuration, multi-channel operation, inter-chip gaps, message modulation, and single carrier frequency. Similarly, with respect to message reception, the present invention addresses single carrier frequency, signal conditioning, filtering, frequency mixing, compression, sampling, decompression, noise floor removal, and digital filtering. Message decoding addresses chip array averaging, shape based correlation, correlation coefficient averaging, message header verification, payload and error detection and/or correction, expected bit verification, and optionally, time-shifted parallel decoding and detection. Finally, with respect to message acknowledgment, the present invention provides a confirmation message and follows retransmission protocol that is specific to the application.

Figure 3:
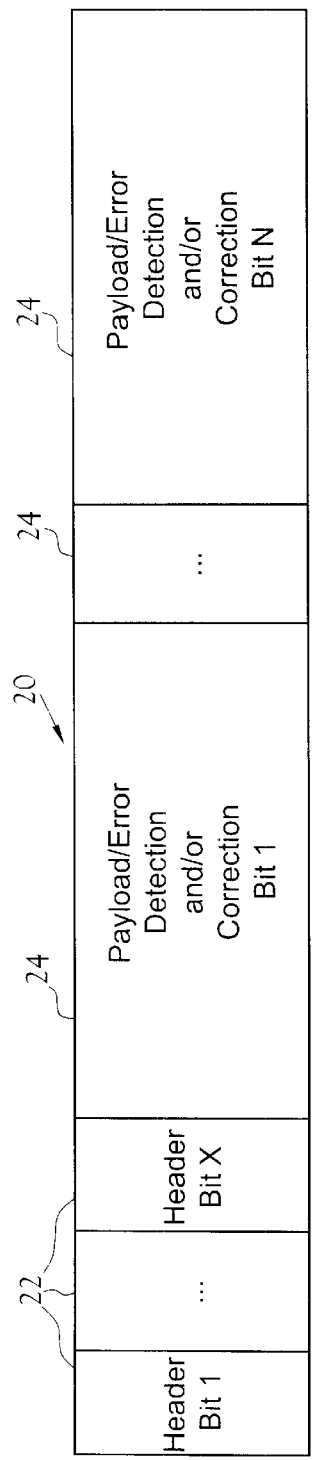
FIG. 3 is a block diagram illustrating the various types and placements of bits in a message.

Each application of the present invention is composed of a designated number of message types. As illustrated in FIG. 3, each message type 20 is a fixed number of bits in length. The number of message types, and length of each message type is variable by application. Each message consists of header bits 22, error detection/correction bits and payload bits 24. An exemplary message 20 currently used is 31 bits in length. The total number of bits in the message 20, including the total number of header bits 22 and error detection/correction bits, and payload-bits 24 form the message definition.

A series of bits 22 within the message is designated as a message header. The number and configuration of the bits 22 within the message header remains constant for each message for a particular application, but is variable by application.

Error detection and/or correction bits 24 reside within the message structure according to the chosen error detection and/or correction algorithm.

Figure 4:
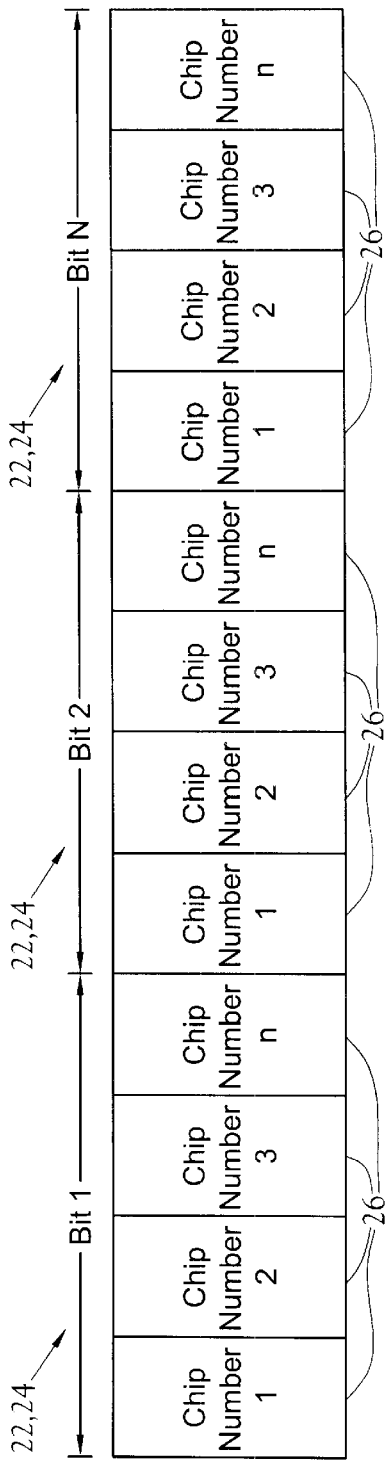
FIG. 4 is a block diagram illustrating the various numbers of chips or pulses in a bit.

As illustrated in FIG. 4, each bit 22,24 is defined by a designated number of chips 26. The chosen modulation method determines how pulses of energy represent chips 26. For example, the amplitude shift keying method uses the presence or absence of pulses to designate chip values. For a given application, all chips 26 are the same duration. However, the chip duration can vary by application. The number of chips 26 comprising a bit 22,24 and the configuration of those chips 26 are defined according to a pseudo-noise chip sequence, or code, that is chosen. A pseudo-noise (PN) sequence array is used to store one or more of the digital codes. The codes are reusable and retrievable upon demand at the time of transmission to represent the digital bit value of 1 or 0. Appropriate pseudo-noise codes are those that are characterized as having a narrow auto correlation peak and a predictable low cross correlation.

Multi-channel operation is accomplished by using a separate pseudo-noise code for each channel. Additionally, a designated bit sequence may exist within the message to assist in accomplishing multi-channel operation. Transmitters and receivers operating on the same channel utilize a single pseudo-noise code to define the "on" and "off" bit designations in each message. Each transmitter and receiver using this code is capable to communicate but separation from other channels using other pseudo-noise codes is accomplished. Although a different pseudo-noise code is utilized for each channel, each code consists of the same number of chips and has the same characteristic of narrow auto correlation peak and predictable low cross correlation. Extending this approach, unique bit sequences in the message combined with the use of separate pseudo-noise codes allows a greater range of operating channels.

Figure 5:
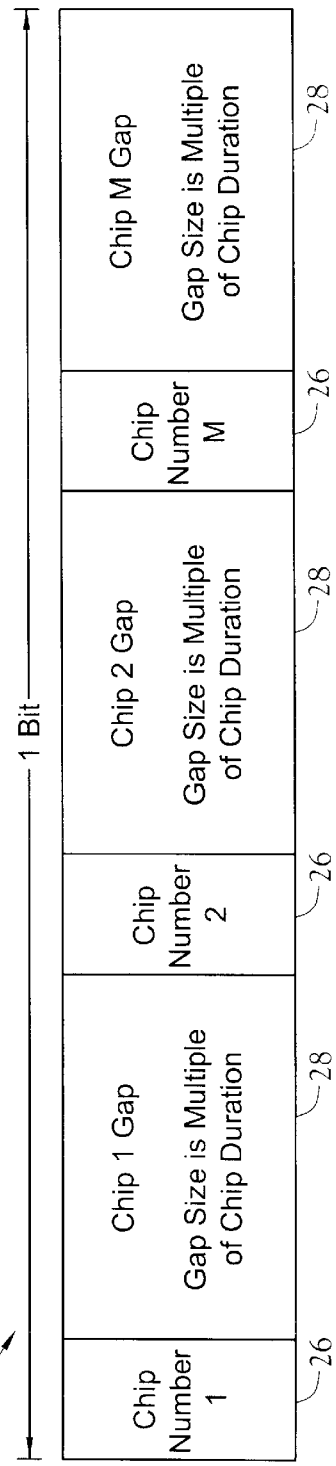
FIG. 5 is a block diagram illustrating the gap between successive chips in a bit.

As illustrated in FIG. 5, chips 26 are spaced to form a gap 28 based on a constant multiple of the chip duration. The gap 28 is used to allow a diminishing of the amplitude of multi-path signals. The gap 28 is constant within the application but is variable by application based on the amount of multi-path interference and environmental noise that is present.

The pseudo-noise code is modulated with each bit according to the chosen modulation technique. If the bit is a "0" the pseudo-noise code is sent out in its proper form. If the bit is a "1" the pseudo-noise code is sent out inverted. Each pseudo-noise modulated bit is then modulated at a chosen single carrier frequency using amplitude, frequency or phase based modulation techniques such as, but not limited to, amplitude shift keying (ASK), frequency shift keying (FSK), and phase shift keying (PSK). Modulation is performed in software running on the processor. The modulation technique is constant for the application but can vary by application.

The chips 26 are transmitted sequentially into the liquid medium by converting the digital signals into electrical pulses that excite the acoustic transducer 12 attached to the transmitting circuitry 16. The transducer 12 is capable of operating over a designated frequency range with only one carrier frequency in that range used at any point in time for that application. The transmitting and receiving circuitry 16 are matched to the same carrier frequency. The carrier frequency is constant for the application but varies by application.

Figure 6:
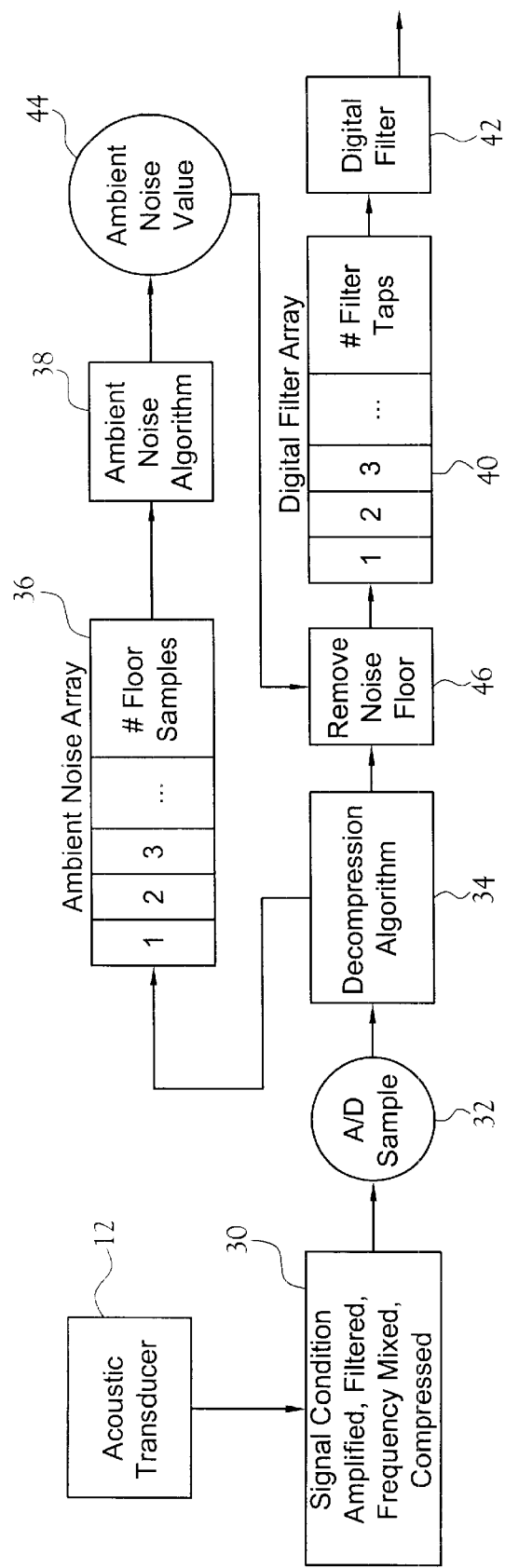
FIG. 6 is a block diagram illustrating the method at which messages are received and conditioned by the device of the present invention.

FIG. 6 illustrates the method at which messages 20 are received by the device 10 of the present invention. One or more acoustic transducers 12 are attached to the circuitry 16 of the receiver. Pulses of carrier energy in the liquid medium excite the acoustic transducer 12. The carrier frequency of the receiver is the same as the carrier frequency of the transmitter. The analog pulses enter a signal conditioning stage 30 of the electronic circuitry 16 and are amplified. The incoming carrier frequency is converted to an intermediate frequency (IF) to prepare for filtering.

The analog signals are filtered and then compressed. The compression process allows the highest and lowest voltage levels to be scaled such that large differences in voltage levels are contained within a designated dynamic range. The dynamic range is chosen and fixed for the application but is variable by application.

The device then samples the voltage level of the incoming pulses via an analog to digital converter 32 at a designated sample rate that is a multiple of the chip rate. The sample rate is constant within an application but is variable by application. The samples are then decompressed using a decompression algorithm 34 that spreads the samples across a designated signal strength scale. This decompression process allows samples with small absolute differences, as well as samples with high and low signal strength values, to be individually recognized and given a value. On a scheduled basis, decompressed samples are sequentially logged into a first-in first-out (FIFO) ambient noise array 36 of a designated size. A computation is performed at 38 that results in an ambient noise value 44 that seeks to represent the amplitude of the noise floor in the environment. The ambient noise value 44 is then removed at 46 from each decompressed signal to raise the signal-to-noise ratio (SNR) of energy induced into the system by the signal of interest compared to energy induced into the system by ambient noise. The size of the ambient noise array 36 is selected based on the requirements of the application. The array 36 is fixed in size for the application and is variable by application. The computation method of the ambient noise value is constant for the application and is variable from application to application.

Each sequential sample is then entered into a FIFO digital filter array 40 of designated size. This filter array 40 is then used by a digital filtering algorithm 42 to remove undesired frequency components. The size of the digital filter array 40 is selected based on the requirements of the application. The array 40 is fixed in size for the application and is variable by application.

Figure 7A:
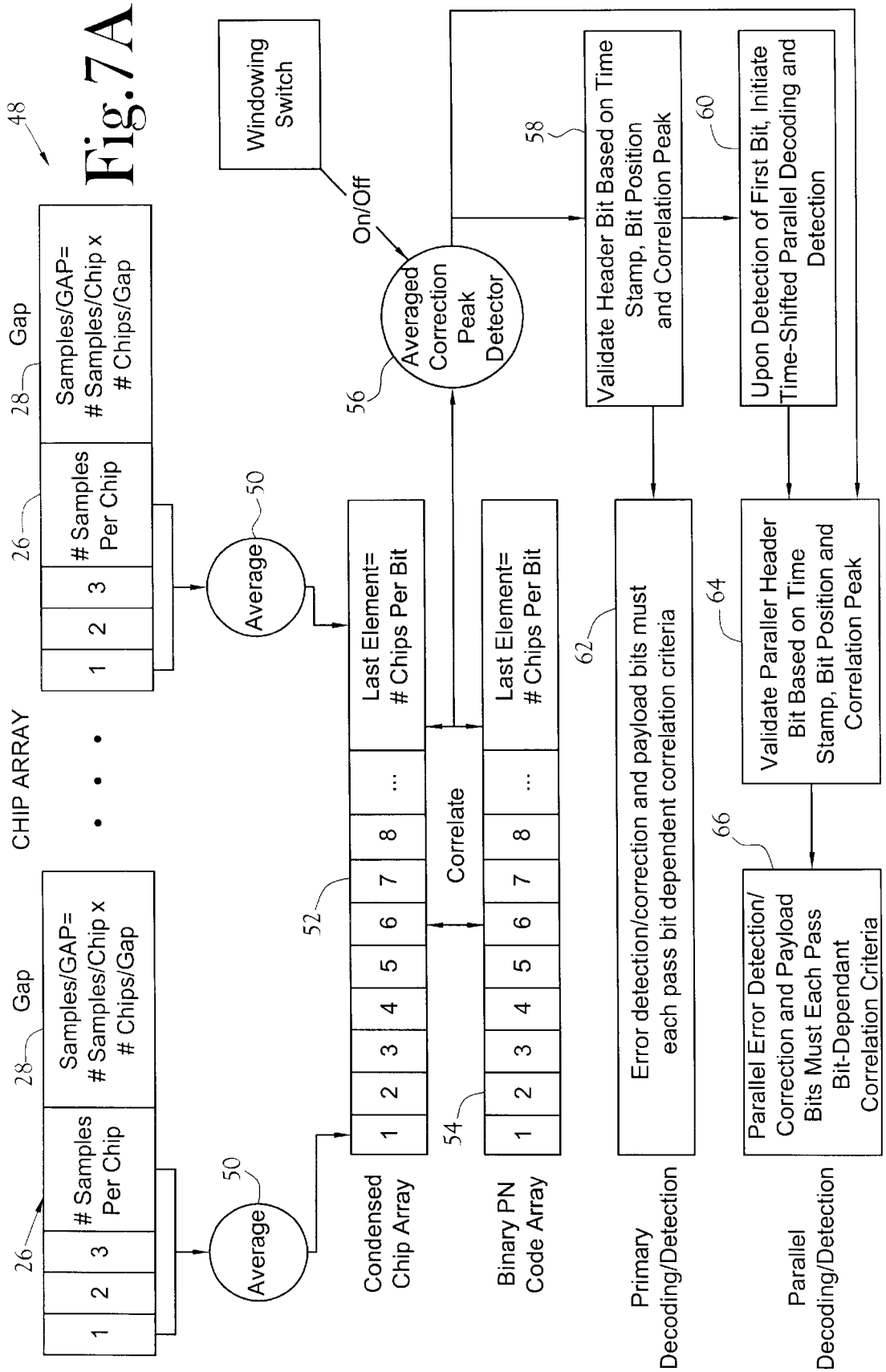
FIGS. 7A and 7B are block diagrams illustrating the method at which messages are decoded and acknowledged by the device of the present invention.

Message decoding, as illustrated in FIG. 7A, occurs after each time domain sample is produced by the digital filter 42 and is stored into a FIFO chip array 48 that is equal in size to the number of samples of chips 26 and chip gaps 28 contained in one message bit as defined by the chosen pseudo-noise code.

As each sequential sample is entered into the array 48, an average 50 is performed on a selection of the samples that are at fixed locations within the array 48 and whose combined duration is equal to the duration of one chip 26. Samples are then disregarded that represent gaps 28 and whose combined duration are equal to the duration of the gap 28 duration between chips 26. The averaged sample values 50 are entered into a condensed chip array 52 that contains a time domain representation of a pseudo-noise code with gaps 28 excluded. The condensed chip array 52 is equal in length to the number of chips 26 defined by the chosen pseudo-noise code. Each group of samples making up a chip 26 is averaged and the averaged sample value is placed into the condensed chip array 52.

As each value is placed in the condensed chip array 52, the graphical shape created by the values in the array is correlated with the shape created by the binary values of the chosen pseudo-noise code as stored in the binary pseudo-noise (PN) code array 54. This shape based correlation offers the advantage of ignoring absolute values and instead determines the validity of the incoming data by comparing its shape to the shape that is expected. Using the pseudo-noise codes that were selected for their characteristics of narrow auto correlation peak and a predictable low cross correlation, only one high correlation coefficient is observed, that being when the shape of the condensed chip array 52 correlates closely with the expected pseudo-noise code shape as contained in the binary PN code array 54. The peak correlation coefficient occurs when the start of the incoming pseudo-noise code aligns with the end of the condensed chip array 52 in the time domain, and sustains its high correlation coefficient for approximately the number of samples the system takes of each chip 26. Before and after the signal is aligned with the condensed chip array 52, the correlation coefficients remain substantially lower than the peak correlation coefficient. From this point to the end of the message detection, all functions may be duplicated, once for primary detection and once for parallel detection.

As each correlation coefficient is calculated it is averaged with prior correlation coefficients at 56. Averaging reduces the probability of recording a high correlation due to noise that could be incorrectly interpreted as a valid bit. The number of values averaged is equivalent to the number of samples the system takes per duration of a single chip. In the present invention the average is performed using the current correlation coefficient and the prior three correlation coefficients.

For verification of a message header, as illustrated at 58, three tests must be met. First, each bit must equal or exceed a designated correlation coefficient threshold in order to be declared as a valid correlation. A correlation coefficient used is greater than 0.7 or less than −0.7 on a scale of 1.0 to −1.0. Second, each bit must match the bit value that is expected at its position within the message header. For example, if the message header consists of 1011, and two valid header bits have been detected ('1' and '0'), the next correlation value must yield a '1' bit for a header correlation to continue. Third, an "expected correlation peak window" is set when the correlation of the first valid header bit is detected. The search for the correlation peak of the second bit is analyzed only within this time domain window. Upon detection of the first valid header bit, a parallel time-shifted decoding and detection algorithm may activate as illustrated at 60, which provides a duplicate time-shifted detection of the received message. This occurs from the end of the correlation process through complete message reception. This allows a message to be detected even if there was a false detection due to noise. The subsequent header bits—in the example described above, bits two through four—will follow this same process, with their time domain window open and close times based on the correlation peak of the first bit.

After the message header is validated, time domain windows are opened for each of the payload and error detection/correction bits of the message at 62, 66. Although samples occur once per sample clock, and the resulting values are placed into the condensed chip array 52, correlation only occurs within each of the time domain windows. The correlation coefficient magnitudes are examined based on the shape based correlation technique described above. The sign of the peak correlation coefficient magnitude is utilized to determine the bit value of data represented by the window. For example, for a positive value of the peak correlation coefficient, it may represent a "0" bit, while a negative value may represent a "1" bit.

Figure 7B:
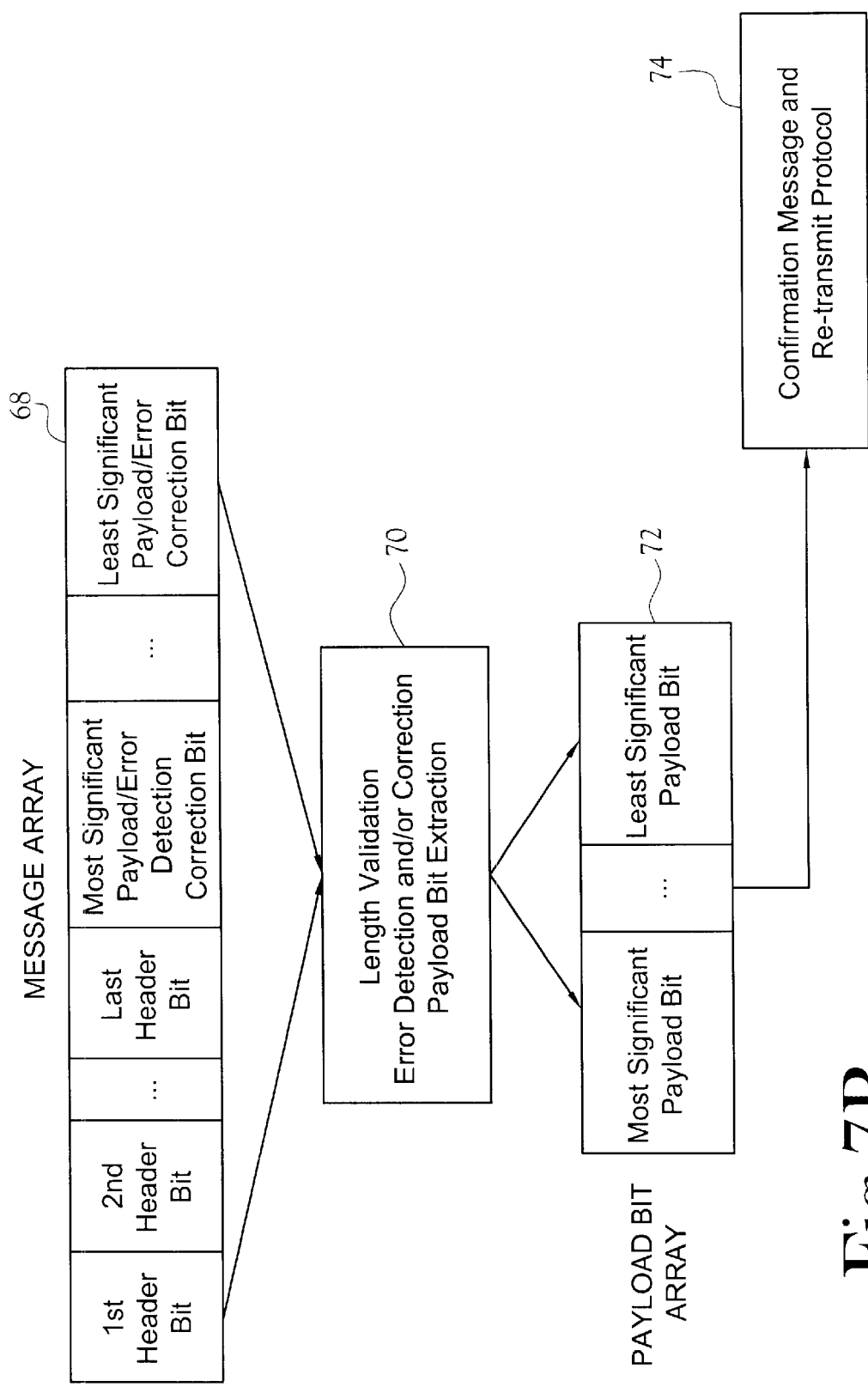

As illustrated in FIG. 7B, as the message header bits, error detection and/or correction bits and payload bits are validated they are stored in a message array 68. When the expected number of bits arrive, the error detection and/or correction bits are utilized to validate, and may if necessary, correct the incoming message as illustrated at 70. Once the message is determined to be error-free, the header and error detection/correction bits are removed. The remaining bits are considered payload bits and are stored in a payload bit array 72.

Illustrated in FIG. 7B is the process of message acknowledgment. Once the payload bit array 72 is determined to be valid, a confirmation message is transmitted to the originator at 74. The confirmation message is a message type recognized by the originator. If the originator does not receive a confirmation message within a prescribed amount of time, the originator then concludes that the previous message was not properly received and another message of a designated message type is sent.

A retransmission protocol defines the interaction between the transmitter and receiver and includes, but is not limited to, the number of re-transmissions, the period spacing of the re-transmissions and the message types to be re-transmitted.

From the foregoing description, it will be recognized by those skilled in the art that a device for bi-directional acoustic communication of coded multi-channel digital messages in a liquid medium offering advantages over the prior art has been provided. Specifically, the device is designed to accomplish such bi-directional communication at lower cost and using lower power than prior art devices. Further, the device is designed to use a single carrier frequency. The device includes the use of acoustic transducers in signal communication, and may include interfaces for communication with a variety of peripherals, host computing devices and user communication and control devices. The device incorporates effective methods of encoding, transmitting, receiving, decoding, and acknowledgment of digital signals for achieving the desired level of reliability, bi-directional communication and multi-channel capability.

While a preferred embodiment has been shown and described, it will be understood that it is not intended to limit the disclosure, but rather it is intended to cover all modifications and alternate methods falling within the spirit and the scope of the invention as defined in the appended claims.

We claim:

1. A device for acoustic communication of coded multi-channel digital messages in a liquid medium, said device comprising:

a transmitter including:
  an acoustic transducer;
  a non-linear switched H bridge transformer;
  a processor;
  a data buffer and control block; and
  a power source; and
a receiver including:
  an acoustic transducer;
  a low noise amplifier;
  at least one filter to set bandwidth;
  normalizing circuitry;
  an analog-to-digital converter;
  a processor;
  a data buffer and control block; and
  a power source.

2. The device of claim 1 wherein each of said transmitter and said receiver operate using a single modulated carrier frequency, said single modulated carrier frequency being fixed for a particular application and can vary by application.

3. The device of claim 2 further configured to communicate with at least one other said device to enable bi-directional acoustic communication.

4. The device of claim 1 further comprising electronic circuitry for carrying each of said transmitter and said receiver and wherein said transmitter acoustic transducer is also used as said receiver acoustic transducer; wherein said transmitter digital signal processor is also used as said receiver digital signal processor; and wherein said transmitter power source is also used as said receiver power source.

5. The device of claim 1 wherein said transmitter further includes a matching circuit.

6. The device of claim 4 further comprising a peripheral interface included with said electronic circuitry for use by each of said transmitter and said receiver for allowing communication with a variety of peripherals for use in an environment in which said device is employed.

7. The device of claim 4 further comprising an intelligent host communication interface included with said electronic circuitry for use by each of said transmitter and said receiver for allowing communication with an intelligent host device.

8. The device of claim 4 further comprising a user communication and control interface included with said electronic circuitry for use by each of said transmitter and said receiver for communicating with at least one user communication and control device.

9. The device of claim 1 wherein said receiver further includes a frequency mixer.

10. A device for acoustic communication of coded multi-channel digital messages in a liquid medium, said device comprising:
  a processor for encoding an outgoing message, decoding an incoming message, and each of said outgoing message and said incoming message being an acoustic signal, each of said outgoing message and said incoming message including at least one of a message definition, a message header, error detection/correction data and payload data;
  system firmware;
  at least one acoustic transducer for transmitting said outgoing message and receiving said incoming message using a modulated carrier frequency; and
  a transmitter including a non-linear H-bridge for exciting one of said at least one acoustic transducer.

11. A device for acoustic communication of coded multi-channel digital messages in a liquid medium, said device comprising:
  a processor for encoding an outgoing message, decoding an incoming message, and each of said outgoing message and said incoming message being an acoustic signal, each of said outgoing message and said incoming message including at least one of a message definition, a message header, error detection/correction data and payload data;
  system firmware;
  at least one acoustic transducer for transmitting said outgoing message and receiving said incoming message using a modulated carrier frequency; and
  a transmitter for transmitting an outgoing message and a receiver for receiving said outgoing message as said incoming message, said receiver being provided for amplification, filtering, frequency conversion, compression and analog-to-digital sampling of said incoming message to produce a received digital signal representative of said incoming signal.

12. A device for acoustic communication of coded multi-channel digital messages in a liquid medium, said device comprising:
  a processor for encoding an outgoing message, decoding an incoming message, and each of said outgoing message and said incoming message being an acoustic signal, each of said outgoing message and said incoming message including at least one of a message definition, a message header, error detection/correction data and payload data;
  system firmware;
  at least one acoustic transducer for transmitting said outgoing message and receiving said incoming message using a modulated carrier frequency; and
  a peripheral interface for allowing communication with at least one peripheral, said at least one peripheral provided for monitoring at least one of movement, temperature, and pressure.

13. A device for acoustic communication of coded multi-channel digital messages in a liquid medium, said device comprising:
  a processor for encoding an outgoing message, decoding an incoming message, and each of said outgoing message and said incoming message being an acoustic signal, each of said outgoing message and said incoming message including at least one of a message definition, a message header, error detection/correction data and payload data;
  system firmware;
  at least one acoustic transducer for transmitting said outgoing message and receiving said incoming message using a modulated carrier frequency; and
  a host interface for allowing communication with an intelligent host device.

14. A device for acoustic communication of coded multi-channel digital messages in a liquid medium, said device comprising:
  a processor for encoding an outgoing message, decoding an incoming message and for acknowledging receipt of said incoming message, each of said outgoing message and said incoming message being an acoustic signal, each of said outgoing message and said incoming message including at least one of a message definition, a message header, error detection/correction data and payload data;
  system firmware; and
  at least one acoustic transducer for transmitting said outgoing message and receiving said incoming message using a modulated carrier frequency.

15. A device for acoustic communication of coded multi-channel digital messages in a liquid medium, said device comprising:
- a processor for encoding an outgoing message, decoding an incoming message, and each of said outgoing message and said incoming message being an acoustic signal, each of said outgoing message and said incoming message including at least one of a message definition, a message header, error detection/correction data and payload data;
- system firmware;
- at least one acoustic transducer for transmitting said outgoing message and receiving said incoming message using a modulated carrier frequency; and
- a user interface for allowing interaction with at least one user communication and control device, said at least one user communication and control device including at least one of an alarm, a push button, and a display.

16. The device of claim 14 wherein said processor is further provided for controlling said device.

17. The device of claim 14 further comprising a transmitter including a non-linear H-bridge for exciting one of said at least one acoustic transducer.

18. The device of claim 14 further comprising a transmitter for transmitting an outgoing message and a receiver for receiving said outgoing message as said incoming message, said receiver being provided for amplification, filtering, frequency conversion, compression and analog-to-digital sampling of said incoming message to produce a received digital signal representative of said incoming signal.

19. The device of claim 14 further comprising a peripheral interface for allowing communication with at least one peripheral, said at least one peripheral provided for monitoring at least one of movement, temperature, and pressure.

20. The device of claim 14 further comprising a host interface for allowing communication with an intelligent host device.

21. The device of claim 14 further comprising a user interface for allowing interaction with at least one user communication and control device, said at least one user communication and control device including at least one of an alarm, a push button, and a display.

22. The device of claim 14 wherein said message definition in either of said outgoing message and said incoming message includes a plurality of bits, said plurality of bits including a plurality of message header bits comprising said message header, a plurality of error detection/correction data bits comprising said error detection/correction data, and a plurality of payload data bits comprising said payload data, and wherein each of said plurality of bits is comprised of a plurality of chips, a configuration of each of said plurality of chips being defined using a pseudo-noise code stored in a pseudo-noise chip array used to store at least one of said outgoing message and said incoming message.

23. The device of claim 22 including more than one said pseudo-noise chip array in or to accomplish multi-channel operation, one distinct said pseudo-noise chip array being designated for use with a single channel.

24. The device of claim 23 wherein said plurality of message header bits, said plurality of error detection/correction data bits, and said plurality of payload data bits are arranged to define a bit sequence unique to said single channel.

25. The device of claim 22 configured to accomplish multi-channel operation wherein said plurality of message header bits, said plurality of error detection/correction data bits, and said plurality of payload data bits are arranged to define a bit sequence unique to a single channel.

26. The device of claim 22 wherein each of said plurality of chips defines a first duration, and wherein said plurality of chips are spaced to form a gap defining a second duration, said second duration being equivalent to a constant multiple of said first duration, said gap being provided to allow an amplitude of a multi-path signal to diminish.

27. The device of claim 22 wherein software operating within said processor modulates said pseudo-noise code with the chosen carrier frequency using a selected modulation method including amplitude, frequency and phase based modulation techniques such as including amplitude shift keying, frequency shift keying, and phase shift keying.

28. The device of claim 22 wherein said acoustic transducer is provided for converting said plurality of chips into an acoustic signal and transmitting said acoustic signal as said outgoing message into the liquid medium at a modulated carrier frequency.

29. A method for using a device for acoustic communication of coded multi-channel digital messages in a liquid medium, said device comprising a processor for encoding an outgoing message, decoding an incoming message, and acknowledging receipt of said incoming message, each of said outgoing message and said incoming message being an acoustic signal, each of said outgoing message and said incoming message including at least one of a message definition, a message header, error detection data and payload data, said device further comprising system firmware and at least one acoustic transducer for transmitting said outgoing message and receiving said incoming message using a modulated carrier frequency, said method comprising the steps of:
- A) transmitting an outgoing message using a first said device, said outgoing message including a plurality of bits, said plurality of bits including a plurality of message header bits comprising said message header, and a plurality of payload data bits comprising said payload data, wherein each of said plurality of bits is comprised of a plurality of chips, a configuration of each of said plurality of chips being defined using a pseudo-noise code, said pseudo-noise code being stored in a pseudo-noise chip array, said plurality of message header bits, and said plurality of payload data bits being stored in a message array and arranged to define a bit sequence unique to said single channel, each of said plurality of chips defining a first duration, wherein software operating within said processor modulates said pseudo-noise code at a chosen carrier frequency using a selected modulation method, said acoustic transducer being provided for converting said plurality of chips into an acoustic signal and transmitting said acoustic signal as said outgoing message into the liquid medium at a modulated carrier frequency;
- B) receiving an incoming message by a second said device, said incoming message received by said second device being said outgoing message from said first device, said step of receiving said incoming message including the steps of:
  - i) receiving said acoustic signal by said at least one acoustic transducer of said second device at said modulated carrier frequency of said first device;
  - ii) processing to condition and amplify said acoustic signal to derive an amplified signal;
  - iii) filtering said amplified signal to derive a filtered signal;
  - iv) sampling a voltage level of said filtered signal to derive a plurality of samples using an analog to digital converter at a designated sample rate, said sample rate being a whole number multiple of said chip rate;

v) storing said plurality of samples sequentially into a first-in first-out chip array;

vi) averaging a selection of said plurality of samples to derive an averaged sample value;

vii) entering said averaged sample value into a condensed chip array containing a time domain representation of a pseudo-noise code, said condensed chip array defining a length equal to said plurality of chips defining said pseudo-noise code; and viii) correlating a graphical shape created by said condensed chip array with a shape created by values of said chosen pseudo-noise code as stored in a binary pseudo-noise code array, to determine a correlation coefficient;

C) verifying said message header, said step of verifying said message header including the steps of:

i) correlating each of said plurality of bits with a designated correlation coefficient threshold;

ii) comparing each of said plurality of bits to an expected value; and iii) setting an expected correlation peak window upon detection of correlation of a first valid header bit, each of said plurality of bits being deemed valid when at least equal to said designated correlation coefficient threshold, when equal to said expected value, and when detected within said expected correlation peak window;

D) opening a time domain window for each of a remainder of said plurality of bits;

E) storing each of said remainder of said plurality of bits in a message array until each of said remainder of said plurality of bits has been received; and F) storing said plurality of payload bits in a payload bit array.

30. The method of claim 29 wherein said outgoing message further includes a plurality of error detection data bits comprising said error detection data, and wherein said message array is further provided for storing said plurality of error detection data bits.

31. The method of claim 30 wherein said error detection data is error detection/correction data, and wherein said plurality of error detection data bits is a plurality of error detection/correction data bits.

32. The method of claim 31, after said step E) of storing each of said plurality of bits, further comprising the step of correcting said incoming message as required.

33. The method of claim 32, after said step of correcting said incoming message, further comprising the step of removing said plurality of bits.

34. The method of claim 29 wherein said plurality of chips are spaced to form a gap defining a second duration, said second duration being equivalent to a constant multiple of said first duration, said gap being provided to allow an amplitude of a multi-path signal to diminish.

35. The method of claim 34, during said step B:vi) of averaging a selection of said plurality of samples, wherein said plurality of samples defines a combined duration equal to said second duration defined by said gap between plurality of chips, and during said step B:vii) of entering said averaged sample value into a condensed chip array, wherein said plurality of gaps is excluded.

36. The method of claim 29 in said step A) of transmitting an outgoing message wherein said selected modulation method is selected from amplitude-, frequency- and phase-based modulation techniques including at least amplitude shift keying, frequency shift keying, and phase shift keying.

37. The method of claim 29 wherein said step B) of receiving an incoming message, after said step ii) of processing to condition and amplify said acoustic signal, further comprising the step of converting said carrier frequency to an intermediate frequency.

38. The method of claim 29 wherein said step B) of receiving an incoming message, after said step iii) of filtering said amplified signal, further includes the step of compressing said amplified signal to derive a compressed signal to contain voltage variations within a selected dynamic range, and wherein said step iv) of sampling a voltage level of said filtered signal samples a voltage level of said compressed signal to derive a plurality of compressed samples.

39. The method of claim 38 wherein said step B) of receiving an incoming message, after said step iv) of sampling a voltage level, further comprising the step of decompressing said plurality of compressed samples to derive a plurality of decompressed samples using a decompression algorithm to spread said plurality of samples across a designated signal strength scale.

40. The method of claim 29, after said step B:v) of storing said plurality of samples sequentially into a first-in first-out chip array, further comprising the steps of:

1) storing said plurality of samples into a first-in first-out ambient noise array;

2) computing an ambient noise value representative of an amplitude of an environmental noise floor; and 3) removing said ambient noise value from said plurality of samples to raise a signal-to-noise ratio of energy induced by said incoming message compared to energy induced by ambient noise.

41. The method of claim 29, after said step B:v) of storing said plurality of samples sequentially into a first-in first-out chip array, further comprising the steps of:

1) entering said plurality of samples into a first-in-first-out digital filter array; and 2) removing undesired frequency components from said plurality of samples.

42. The method of claim 29, after said step B:viii) of correlating a graphical shape, further comprising the step of averaging said correlation coefficient with at least one prior said correlation coefficients.

43. The method of claim 29, after said step F) of storing said plurality of payload data bits, further comprising the step of transmitting a confirmation message to said first device upon determination that said payload bit array is valid.

44. The method of claim 43 further comprising the step of re-transmitting said outgoing message by said first device upon passage of a determined period of time without receipt of said confirmation message.

45. The method of claim 29, after said step of B) receiving an incoming message by a second said device, and simultaneously with said step of C) verifying said message header, further comprising the step of initiating a parallel time-shifted decoding and detection algorithm upon detection of a first said header bit for message detection following a false detection due to noise.

46. A device for acoustic communication of coded multi-channel digital messages in a liquid medium, said device comprising:

a processor for encoding an outgoing message, decoding an incoming message, and each of said outgoing message and said incoming message being an acoustic signal, each of said outgoing message and said incoming message including at least one of a message definition, a message header, error detection/correction data and payload data, wherein said message definition in either of said outgoing message and said incoming message includes a plurality of bits, said plurality of bits including a plurality of message header bits comprising said message header, a plurality of error detection/correction data bits comprising said error detection/correction data, and a plurality of payload data bits comprising said payload data, and wherein each of said plurality of bits is comprised of a plurality of chips, a configuration of each of said plurality of chips being defined using a pseudo-noise code stored in a pseudo-noise chip array used to store at least one of said outgoing message and said incoming message;

system firmware; and at least one acoustic transducer for transmitting said outgoing message and receiving said incoming message using a modulated carrier frequency.

47. The device of claim 46 including more than one said pseudo-noise chip array in or to accomplish multi-channel operation, one distinct said pseudo-noise chip array being designated for use with a single channel.

48. The device of claim 47 wherein said plurality of message header bits, said plurality of error detection/ correction data bits, and said plurality of payload data bits are arranged to define a bit sequence unique to said single channel.

49. The device of claim 46 configured to accomplish multi-channel operation wherein said plurality of message header bits, said plurality of error detection/correction data bits, and said plurality of payload data bits are arranged to define a bit sequence unique to a single channel.

50. The device of claim 46 wherein each of said plurality of chips defines a first duration, and wherein said plurality of chips are spaced to form a gap defining a second duration, said second duration being equivalent to a constant multiple of said first duration, said gap being provided to allow an amplitude of a multi-path signal to diminish.

51. The device of claim 46 wherein software operating within said processor modulates said pseudo-noise code with the chosen carrier frequency using a selected modulation method including amplitude, frequency and phase based modulation techniques such as including amplitude shift keying, frequency shift keying, and phase shift keying.

52. The device of claim 46 wherein said acoustic transducer is provided for converting said plurality of chips into an acoustic signal and transmitting said acoustic signal as said outgoing message into the liquid medium at a modulated carrier frequency.

* * * * *